(12) United States Patent
Roverso et al.

(10) Patent No.: US 9,614,887 B2
(45) Date of Patent: Apr. 4, 2017

(54) DISTRIBUTING DATA CONTENT IN PRIVATE NETWORKS

(71) Applicant: Hive Streaming AB, Stockholm (SE)

(72) Inventors: Roberto Roverso, Stockholm (SE); Sameh El-Ansary, Stockholm (SE); Mikael Hogqvist, Stockholm (SE)

(73) Assignee: Hive Streaming AB, Stockholm (SE)

( * ) Notice: Subject to any disclaimer, the term of this patent is extended or adjusted under 35 U.S.C. 154(b) by 46 days.

(21) Appl. No.: 14/369,899

(22) PCT Filed: Jul. 17, 2013

(86) PCT No.: PCT/EP2013/065060
§ 371 (c)(1),
(2) Date: Jun. 30, 2014

(87) PCT Pub. No.: WO2015/007312
PCT Pub. Date: Jan. 22, 2015

(65) Prior Publication Data
US 2015/0350280 A1 Dec. 3, 2015

(51) Int. Cl.
*G06F 15/16* (2006.01)
*H04L 29/06* (2006.01)
*H04L 29/08* (2006.01)

(52) U.S. Cl.
CPC ........ *H04L 65/602* (2013.01); *H04L 63/0227* (2013.01); *H04L 63/0272* (2013.01);
(Continued)

(58) Field of Classification Search
CPC ............... H04L 67/104; H04L 67/1048; H04L 63/0227; H04L 63/0272
(Continued)

(56) References Cited

U.S. PATENT DOCUMENTS

2008/0307519 A1* 12/2008 Curcio ................ H04L 63/0227
726/15
2010/0042668 A1* 2/2010 Liang .................... H04L 67/104
709/201

OTHER PUBLICATIONS

Hierarchically Clustered P2P Streaming System—PCT, X reference NPL "numbered.".*
(Continued)

*Primary Examiner* — Kyung H Shin
(74) *Attorney, Agent, or Firm* — Volpe and Koenig, P.C.

(57) ABSTRACT

The present invention relates to a method and device for distributing data content in a private network.
Thus, in a first aspect of the present invention, a method is provided for distributing data content in a private network comprising a number of secondary network segments each connected to a main network segment via a virtual private network connection, which private network comprises devices for rendering the data content. The method comprises the step of arranging the devices rendering the data content as peers in a peer-to-peer (P2P) connectivity overlay network within the private network. Further, the method comprises the step of assigning a managing peer in the main network segment responsible to download the data content from a streaming source outside the private network via a gateway and to distribute the data content to at least one further peer in the main network segment. Moreover, the method comprises the step of assigning a managing peer in each secondary network segment responsible to fetch the data content from a peer in the main network segment and to distribute the fetched data content to at least one further peer within the same secondary network segment.

15 Claims, 3 Drawing Sheets

(52) U.S. Cl.
CPC ........ *H04L 67/104* (2013.01); *H04L 67/1042* (2013.01); *H04L 67/1044* (2013.01); *H04L 67/1048* (2013.01); *H04L 67/1063* (2013.01); *H04L 67/1072* (2013.01); *H04L 67/1089* (2013.01); *H04L 67/1091* (2013.01); *H04L 67/1093* (2013.01); *H04L 67/1051* (2013.01)

(58) Field of Classification Search
USPC ................... 709/201, 219, 209, 225; 726/15
See application file for complete search history.

(56) References Cited

OTHER PUBLICATIONS

Chao Liang, et al., "Hierarchically Clustered P2P Streaming System", Global Telecommunications Conference 2007, Nov. 1, 2007, pp. 236-241.
International Search Report, dated Apr. 29, 2014, 4 pages.

\* cited by examiner

DISTRIBUTING DATA CONTENT IN PRIVATE NETWORKS

TECHNICAL FIELD

The present invention relates to a method and device for distributing data content in a private network.

BACKGROUND

In recent years, there has been a growing demand for data streaming via unicast. Although multi-cast streaming has been around for many years, the cost and complexity of installing the necessary hardware has made it less popular. Multicast streaming has traditionally been dependent on the Real-time Transport Protocol (RTP)/Real-time Streaming Protocol (RTSP), the use of which has been declining with the spread of more versatile protocols such as Hypertext Transfer Protocol (HTTP) streaming. Hence, the shift has been towards unicast streaming using more modern protocols.

The main disadvantage of unicast streaming is that it creates a potential bottleneck at the data content streaming source with a linear increase in bandwidth demand as the number of renderers of data content increases. A possible solution to that problem is to do web caching, where local copies of the stream are stored in a given network segment for consumption by all the renderers within that segment.

On the open Internet, such caching and redistribution is achieved by via Content Distribution Networks (CDNs). Larger private networks by contrast interconnect multiple network segments representing geographically distributed offices with fixed virtual private network (VPN) links. Inside an office, the network is constructed with high capacity links and switches. Traffic from and to the public Internet is routed through a gateway link of fixed capacity or through one or more segments until a gateway link is reached.

The main bottlenecks in private networks are the VPN and gateway links which are typically not dimensioned to sustain the load of delivering one or more data content streams to a large amount of renderers of the data content at the same time. Overcoming those bottlenecks can be attained by having web caching appliances distributed throughout the network as needed. However, that entails the procurement, administration, and maintenance of those appliances.

SUMMARY

An object of the present invention is thus to solve, or at least mitigate, these problems in the art and to provide an improved method and device of distributing data content in a private network.

This object is attained in a first aspect of the present invention by a method of distributing data content in a private network comprising a number of secondary network segments each connected to a main, primary network segment via a virtual private network connection, which private network comprises devices for rendering the data content. The method comprises the step of arranging the devices rendering the data content as peers in a peer-to-peer (P2P) connectivity overlay network within the private network. Further, the method comprises the step of assigning a managing peer in the main network segment responsible to download the data content from a streaming source outside the private network via a gateway and to distribute the data content to at least one further peer in the main network segment. Moreover, the method comprises the step of assigning a managing peer in each secondary network segment responsible to fetch the data content from a peer in the main network segment and to distribute the fetched data content to at least one further peer within the same secondary network segment.

This object is attained in a second aspect of the present invention by a device for coordinating distribution of data content in a private network comprising a number of secondary network segments each connected to a main network segment via a virtual private network connection, which private network comprises devices for rendering the data content. The coordinating device comprises a processing unit being configured to arrange the devices rendering the data content as peers in a P2P connectivity overlay network within the private network. The processing unit is further configured to assign a managing peer in the main network segment responsible to download the data content from a streaming source outside the private network via a gateway and instruct the managing peer in the main network segment to distribute the data content to at least one further peer in the main network segment. Moreover, the processing unit is configured to assign a managing peer in each secondary network segment responsible to fetch the data content from a peer in the main network segment and to instruct the managing peer in each secondary network segment to distribute the fetched data content to at least one further peer within the same secondary network segment.

Thus, a private network setup e.g. at a corporation or a public authority may comprise multiple secondary network segments representing geographically distributed offices which are connected to a main network segment via fixed VPN links. Inside a network segment, the network is constructed with high capacity links and switches. Traffic from and to the public Internet, and thus to/from a streaming source providing data content, is routed via a gateway link of fixed capacity to the main segment of the private network. The main bottlenecks in the private network are the VPN links and the gateway link which typically are not dimensioned to sustain the load of delivering one or more streams to a large amount of renderers of data content at the same time.

To this end, with the present invention, the rendering devices in the private network will advantageously be arranged as peers in a P2P connectivity overlay network within the private network by a coordinating device known as a tracker. Thereafter, a managing peer is assigned in the main network segment to download the data content from the streaming source and to distribute the data content to one or more further peers in the main network segment in a P2P manner where the peers share the data content among each other.

Further, a managing peer is assigned in each secondary network segment being responsible for fetching the data content from a peer in the main network segment via the respective VPN link and distributing the fetched data content to one or more further peers within the same secondary network segment. Hence, this provides a highly efficient approach of performing live streaming in a private network since there is only one incoming data content stream per network segment, and that the peer devices are utilized for distributing the data content among each other within each segment, as compared to a system using one or more routers to multicast the data content within and across the segments. With the present invention, expensive and network-specific multicast routers are not needed.

Different embodiments of the present invention are defined by the dependent claims and discussed subsequently in the detailed description.

It is noted that the invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
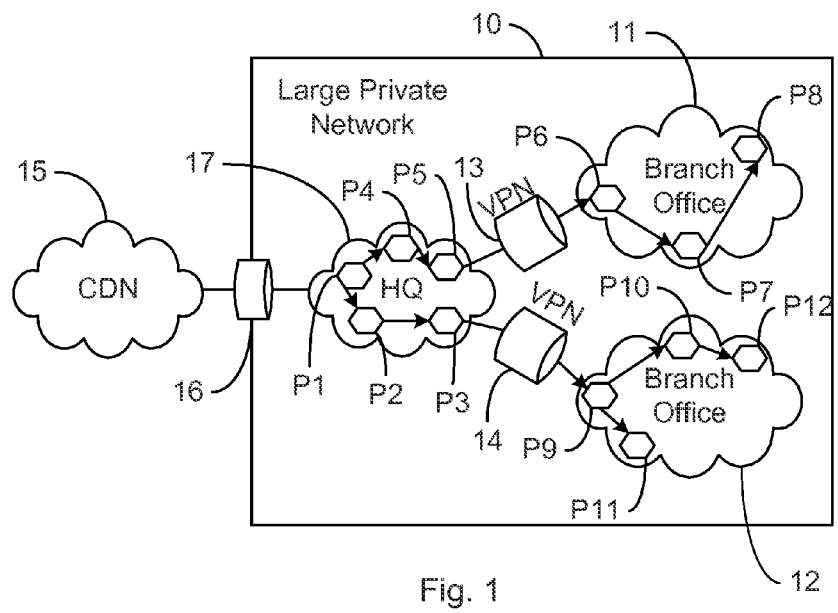
FIG. 1 shows a system for distributing data content in a private network according to an embodiment of the present invention.

FIG. 1 shows a system for distributing data content in a private network according to an embodiment of the present invention. The private network 10 could be setup e.g. at a corporation or a public authority where multiple secondary network segments 11, 12 representing geographically distributed offices are connected to a main network segment 17 via fixed VPN links 13, 14, respectively. Inside a network segment, the network is constructed with high capacity links and switches. Traffic from and to the public Internet, and thus the CDN 15 comprising a source such as a server for streaming requested data content, is routed via a gateway (GTW) link 16 of fixed capacity to the main segment (HQ) 17 of the private network 10. The main bottlenecks in the private network 10 are the VPN links 13, 14 and the gateway link 16 which typically are not dimensioned to sustain the load of delivering one or more streams to a large amount of renderers of data content at the same time. The network segments 11, 12, 17 are typically arranged according to a given hierarchy within the private network. At the highest level of the hierarchy is the main network segment 17, typically being the head quarter (or regional head quarter) of the organization implementing the private network 10. For example, in a corporate setting, the main network segment 17 may be a regional division of a multinational cooperation.

Within the main segment 17, there could be three sub-networks that physically comprise a local area network (LAN), one for the regional head office 17, and one for each of the regional branch offices 11, 12, being for instance two productions plants in that region.

To this end, with the present invention as illustrated in FIG. 1, rendering devices, being e.g. television sets, mobile phones, computers, tablets, smart phones, etc., which will request data content are arranged as peers $p_1$-$p_{12}$ in a peer-to-peer (P2P) connectivity overlay network within the private network 10 by a tracker (not shown). Thereafter, a managing peer $p_1$ is assigned in the main network segment 17 to communicate with a streaming source in the CDN 15 and to distribute the data content from the CDN 15 via the gateway 16 to at least one further peer in the main network segment 17. In this particular example, the managing peer $p_1$ distributes the data content to a first and a second peer $p_2$, $p_4$ which in their turn distributes the data content to a third and a fourth peer $p_3$, $p_5$, respectively, in a P2P manner.

Further, a managing peer $p_6$, $p_9$ is assigned in each secondary network segment 11, 12 being responsible for fetching the data content from a peer in the main network segment 17 via the VPN links 13, 14 and distributing the fetched data content to at least one further peer within the same secondary network segment. In this particular example, the managing peer $p_6$ of the first secondary segment 11 distributes the data content to a first peer $p_7$ in the first secondary segment 11, while the first peer $p_7$ distributes the data content to yet another peer $p_8$. Further, the managing peer $p_9$ of the second secondary segment 12 distributes the data content to a first and a second peer $p_{10}$, $p_{11}$ in the second secondary segment 12. Finally, the first peer $p_{10}$ of the second segment 12 distributes the data content to yet another peer $p_{12}$.

This provides a highly efficient approach of performing live streaming in a private network since there is only one incoming data content stream per network segment, and that the peer devices are utilized for distributing the data content among each other within each segment, as compared to a system using one or more routers to multicast the data content within and across the segments. With the present invention, expensive and network-specific multicast routers are not needed. Peers are arranged in either a tree or a mesh P2P connectivity overlay within a given segment and thus exchanges streaming data in an efficient manner. In practice, a private network may comprise tens of different network segments and thousands of peers.

Many approaches have been developed to efficiently make use of the upload capacity of the peers. These approaches can be divided into two main categories.

Tree-based systems are based on constructing one or more structured trees in an overlay network where peers at the top of each tree feed the peers below them. This approach works well when the peers do not join or leave the system at high frequency as data flow is achieved without any further messages between the peers. However, in a high churn environment, tree maintenance can be very costly and sometimes destruction and reconstruction of the tree(s) are necessary.

Mesh-based systems do not enforce a tree construction, or in other words peer connectivity does not form a specified overlay, and they are connected to each other in an unstructured manner. They exchange data through so called gossip communication or by sending data request messages to each other. A disadvantage with mesh-based systems is that they can have a long setup time, as nodes need to negotiate with each other to find peers. However, many systems use the mesh-based approach as it is very robust to high churn. In such systems each peer has a number of neighbours that it potentially downloads from and failure of any neighbour is thus not as critical as in tree-based approaches.

Although individual peers take decisions locally without a global view in the mesh-based approaches, they can still reach comparable savings to tree based approaches when peer churn is considered, mainly since they do not have to carry the heavy overhead of maintaining a view of the global connectivity structure.

Figure 2A:
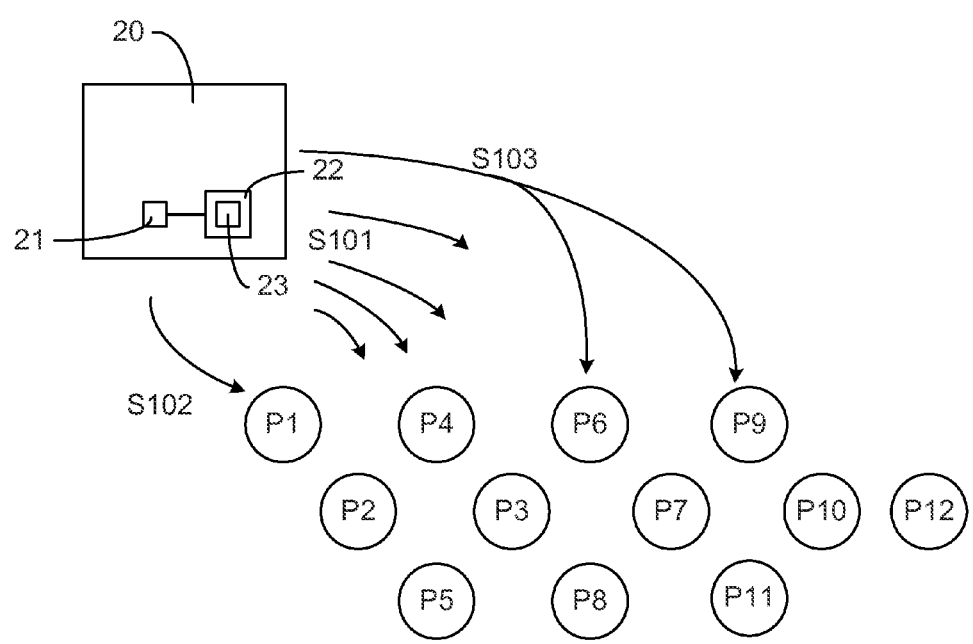
FIG. 2a shows a further embodiment of the present invention illustrating a supervising device known as a tracker for managing a P2P overlay network.

FIG. 2a shows a further embodiment of the present invention illustrating a supervising device for managing the P2P connectivity overlay network known as a tracker 20. The tracker generally acts a central coordinator instructing the peers from which other peers a requested piece of data content should be downloaded. The tracker 20 generally has access to network and peer states such as peer upload bandwidth, peer download bandwidth, most recently downloaded part for each requested data content stream, Network Address Translation (NAT) compatibility type, peer CPU load, peer IP address, position in data stream for the data content to be downloaded, etc. The state of a given peer can be used to construct a figure of merit that can in turn be used to rank the peers. Peers with higher rank can hence be considered more reliable and more capable of uploading the data stream to other peers.

Thus, the tracker 20 manages the distribution of data content in the private network according to embodiments of the present invention with a processing unit 21 embodied in the form of one or more microprocessors arranged to execute a computer program 23 downloaded to a suitable storage medium 22 associated with the microprocessor, such as a Random Access Memory (RAM), a Flash memory or a hard disk drive. The processing unit 21 is arranged to at least partly carry out the method according to embodiments of the present invention when the appropriate computer program 23 comprising computer-executable instructions is downloaded to the storage medium 22 and executed by the processing unit 21. The storage medium 22 may also be a computer program product comprising the computer program 23. Alternatively, the computer program 23 may be transferred to the storage medium 22 by means of a suitable computer program product, such as a floppy disk or a memory stick. As a further alternative, the computer program 23 may be downloaded to the storage medium 22 over a network. The processing unit 21 may alternatively be embodied in the form of an application specific integrated circuit (ASIC), a field-programmable gate array (FPGA), a complex programmable logic device (CPLD), a digital signal processor (DSP), etc.

Figure 3:
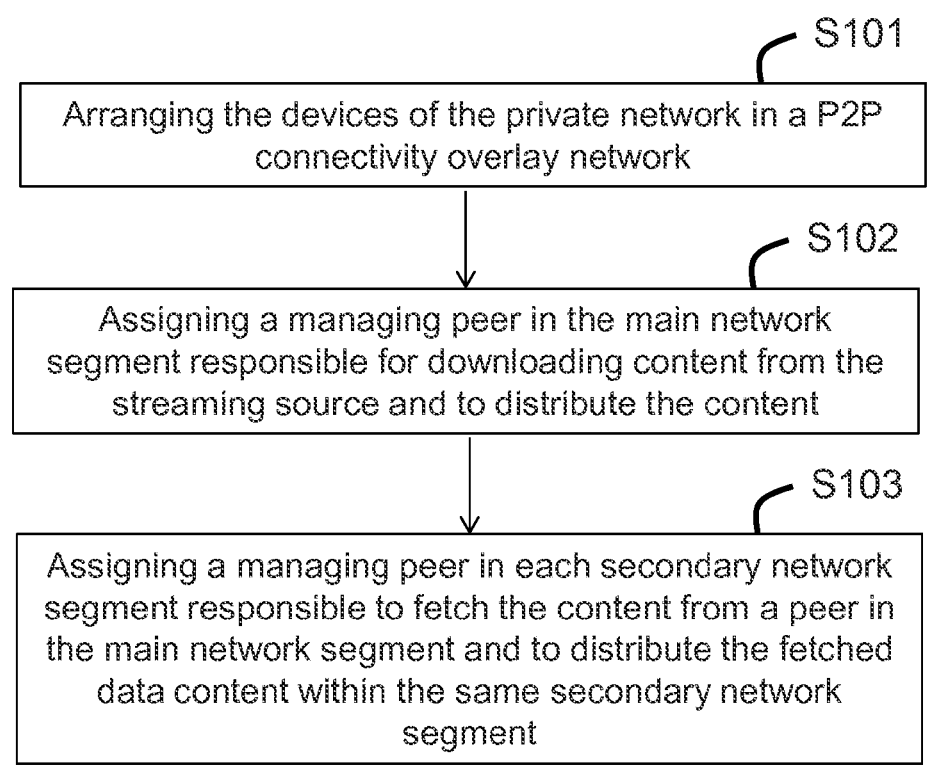
FIG. 3 illustrates a flowchart of a method of distributing data in a private network according to an embodiment of the present invention.

The method of distributing data in a private network according to an embodiment of the present invention will be illustrated with reference to FIG. 2a and further with reference to the flowchart of FIG. 3. In a first step S101, the processing unit 21 of the tracker 20 arranges the devices rendering the data content as peers $p_1$-$p_{12}$ in a P2P connectivity overlay network within the private network. As will be discussed in more detail subsequently, this could be undertaken by the tracker 20 by providing each peer $p_1$-$p_{12}$ with a list of neighbouring peers from which the peer can attempt to download the data content.

In a second step S102, the processing unit 21 of the tracker 20 assigns a managing peer $p_1$ in the main network segment responsible to communicate with a streaming source outside the private network via a gateway and to distribute the data content to at least one further peer in the main network segment. This assignment may be performed by considering a ranking of the peers and selecting the peer having the highest ranking as the managing peer.

In a third step S103, the processing unit 21 of the tracker 20 assigns a managing peer $p_6$, $p_9$ in each secondary network segment responsible to fetch the data content from a peer in the main network segment and to distribute the fetched data content to at least one further peer within the same secondary network segment. Again, this assignment may be performed by considering a ranking of the peers in each secondary segment and selecting the peer having the highest ranking as the managing peer. This changes the data-flow overlay such the each peer within a secondary segment is either downloading the data content stream from the managing peer of the same secondary network segment or another other peer within the same secondary segment.

Figure 2B:
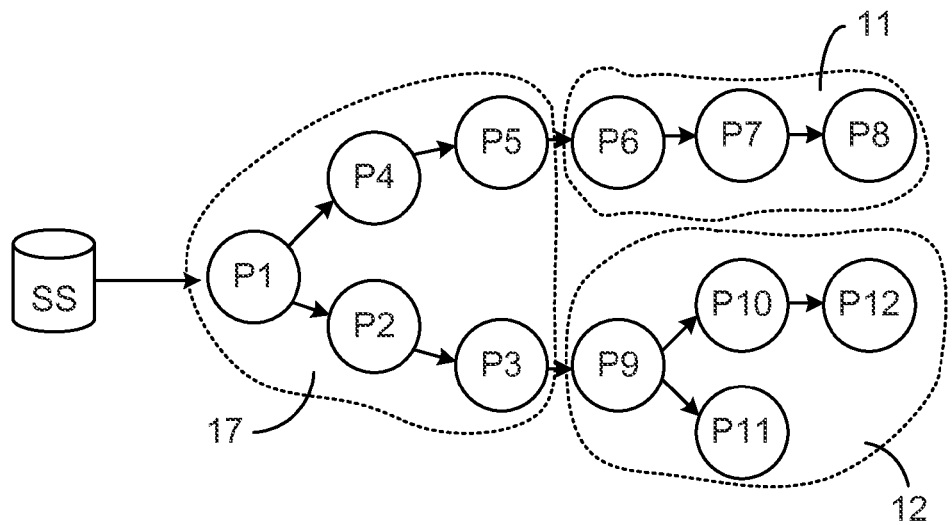
FIG. 2b shows a result of arranging of peers in a P2p overlay network using the method of the present invention.

FIG. 2b shows the result of the arranging of the peers $p_1$-$p_{12}$ as previously illustrated in FIG. 1, where the managing peer $p_1$ in the main segment 17 downloads data content from a streaming source SS and distributes the data content to peers $p_2$, and $p_4$, and so on.

Figure 4:
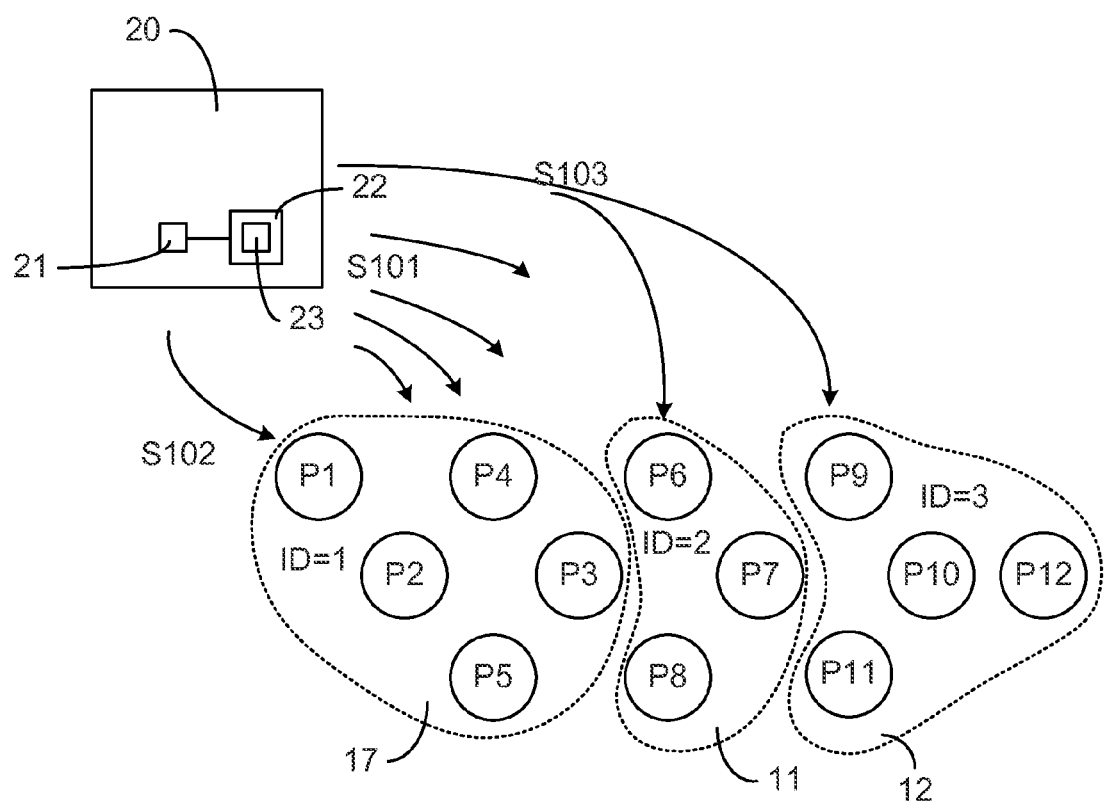
FIG. 4 shows a tracker arranging the peers no a P2P overlay network according to a further embodiment of the present invention.

FIG. 4 shows a further embodiment of the present invention where the processing unit 21 of the tracker 20 acquires a network segment identifier for each peer and determines in which network segment each peer should belong based on the network segment identifier. Thus, all peers in the main segment 17 is associated with ID=1, all peers in the first secondary segment 11 is associated with ID=2, while all peers in the second secondary segment 12 is associated with ID=3. This identifier may be acquired by the processing unit 21 of the tracker 20 from the respective peer or by a central registry maintained by an owner of the private network. This is advantageous since the process of ranking and arranging the peers is easier and more straightforward for the tracker 20 which can treat the peers of a particular segment separate from the peers of another segment.

In an embodiment of the present invention, when arranging the peers in a P2P connectivity overlay network, the tracker sends each peer a list of neighbouring peers which they can try to connect to in order to download a desired piece of data content.

In a further embodiment of the present invention, the peers expand their list of neighbouring peers by using distributed sampling of the network (e.g. by applying a gossip protocol, either random or biased).

In still a further embodiment of the present invention each peer receives periodic updates on state of its neighbouring peers, either by applying a distributed protocol or through the tracker. The updates contain one or more of the following data elements: download point of each peer, a metric of each peer's processing power including e.g. peer CPU capability such as CPU frequency, number of CPU cores, RAM size, etc, a connectivity metric that would give a higher score for peers who are on a fixed connection as compared to peers having radio connection (e.g. WiFi). That metric may also take into account the relative peer upload and/or download bandwidth.

Advantageously, the states of the neighbouring peers are considered construct a more efficient P2P overlay network. The tracker may thus issue connectivity orders to peers as necessary such that the new improved P2P overlay network dynamically can be realized, e.g. at peer churn.

Further, the information on the state of the peers is used to calculate a score for each peer. The calculated score is used as a ranking of the peers in a given segment, and the peer considered to have the highest rank within a network segment in the private network is assigned as the managing peer. Since the managing peer of each network segment within the private network is closest to the incoming link for each segment, the managing peer will be the peer in the respective segment that attains the data content first, before all others peers in the same segment. In the P2P overlay network according to embodiments of the present invention, the tracker receives information of the states of joining and existing peers, thus continuously updating the rank of the respective peer in order to send connectivity orders to peers in case the rank indicates that peers should try to connect to peers other than the ones they are currently connected to.

The information regarding the state of the peers, on which information the ranking is based and on which information position of each peer in the P2P overlay network may be determined, includes one or more of peer upload bandwidth, peer download bandwidth, most recently downloaded part for each requested data content stream, NAT compatibility type, peer CPU load, peer IP address, position in data stream for the data content to be downloaded, etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method, for use in a coordinating device, of distributing data content in a private network comprising a number of secondary network segments each connected to a main network segment via a virtual private network (VPN) connection, which private network comprises devices for rendering the data content, the method comprising the steps of:
   arranging the devices rendering the data content as peers in a peer-to-peer (P2P) connectivity overlay network within the private network;
   assigning a main managing peer in the main network segment, wherein the main network segment includes at least the main managing peer and one or more non-managing peers, and the main managing peer is responsible to download the data content from a streaming source outside the private network via a gateway and to distribute the data content to at least one non-managing peer in the main network segment; and
   assigning a secondary managing peer in each secondary network segment, wherein the secondary network segment includes at least the secondary managing peer and one or more non-managing peers, and the secondary managing peer is responsible to fetch the data content from one of the non-managing peers in the main network segment and to distribute the fetched data content to at least one non-managing peer within the same secondary network segment.

2. The method of claim 1, wherein the step of arranging the P2P overlay network comprises:
   providing each peer with a list of neighbouring peers from which said each peer can attempt to download the data content.

3. The method of claim 1, wherein the steps of assigning a managing peer in each network segment further comprises:
   ranking the peers and selecting the peer in each network segmenting having the highest rank as the managing peer.

4. The method of claim 1, further comprising:
   receiving peer state information including one or more of the following parameters to be considered when arranging the peers in the P2P overlay network: peer upload bandwidth, peer download bandwidth, most recently downloaded part for each requested data content stream, network address translation (NAT) compatibility type, peer CPU load, peer IP address, and position in data stream for the data content to be downloaded; and
   determining position of a current peer in the P2P overlay network based on said peer state information.

5. The method of claim 1, further comprising:
   acquiring a network segment identifier for each peer; and
   determining in which network segment each peer should belong based on said network segment identifier.

6. A device for coordinating distribution of data content in a private network comprising a number of secondary network segments each connected to a main network segment via a virtual private network (VPN) connection, which network segment comprises devices for rendering the data content, the coordinating device comprising a processing unit being configured to:
   arrange the devices rendering the data content as peers in a peer-to-peer (P2P) overlay network within the private network;
   assign a main managing peer in the main network segment, wherein the main network segment includes at least the main managing peer and one or more non-managing peers, and the main managing peer is responsible to download the data content from a streaming source outside the private network via a gateway and instruct the managing peer in the main network segment to distribute the data content to at least one non-managing peer in the main network segment; and
   assign a secondary managing peer in each secondary network segment, wherein the secondary network segment includes at least the secondary managing peer and one or more non-managing peers, and the secondary managing peer is responsible to fetch the data content from one of the non-managing peers in the main network segment and to instruct the secondary managing peer in each secondary network segment to distribute the fetched data content to at least one non-managing peer within the same secondary network segment.

7. The device for coordinating distribution of data content of claim 6, the processing unit further being configured to:
   provide each peer with a list of neighbouring peers from which said each peer can attempt to download the data content.

8. The device for coordinating distribution of data content of claim 6, the processing unit further being configured to:
   rank the peers and select the peer in each network segmenting having the highest rank as the managing peer.

9. The device for coordinating distribution of data content of claim 6, the processing unit further being configured to:
   receive peer state information including one or more of the following parameters to be considered when arranging the peers in the P2P overlay network: peer upload bandwidth, peer download bandwidth, most recently downloaded part for each requested data content stream, network address translation (NAT) compatibility type, peer CPU load, peer IP address, and position in data stream for the data content to be downloaded; and
   determine position of a current peer in the P2P overlay network based on said peer state information.

10. The device for coordinating distribution of data content of claim 6, the processing unit further being configured to:
   acquire a network segment identifier for each peer; and determine in which network segment each peer should belong based on said network segment identifier.

11. A non-transitory computer-readable storage medium, the computer readable storage medium having processor executable instructions stored thereon, which when executed by the at least one processing unit, will cause the at least one processing unit to perform a method of distributing data content in a private network comprising a number of secondary network segments each connected to a main network segment via a virtual private network (VPN) connection, which private network comprises devices for rendering the data content, the method comprising the steps of:

arranging the devices rendering the data content as peers in a peer-to-peer (P2P) connectivity overlay network within the private network;

assigning a main managing peer in the main network segment, wherein the main network segment includes at least the main managing peer and one or more non-managing peers, and the main managing peer is responsible to download the data content from a streaming source outside the private network via a gateway and to distribute the data content to at least one non-managing peer in the main network segment; and assigning a secondary managing peer in each secondary network segment, wherein the secondary network segment includes at least the secondary managing peer and one or more non-managing peers, and the secondary managing peer is responsible to fetch the data content from one of the non-managing peers in the main network segment and to distribute the fetched data content to at least one non-managing peer within the same secondary network segment.

12. The non-transitory computer readable storage medium of claim 11, wherein the step of arranging the P2P overlay network comprises:

providing each peer with a list of neighbouring peers from which said each peer can attempt to download the data content.

13. The non-transitory computer readable storage medium of claim 11, wherein the steps of assigning a managing peer in each network segment further comprises:

ranking the peers and selecting the peer in each network segmenting having the highest rank as the managing peer.

14. The non-transitory computer readable storage medium of claim 11, further comprising:

receiving peer state information including one or more of the following parameters to be considered when arranging the peers in the P2P overlay network: peer upload bandwidth, peer download bandwidth, most recently downloaded part for each requested data content stream, network address translation (NAT) compatibility type, peer CPU load, peer IP address, and position in data stream for the data content to be downloaded; and determining position of a current peer in the P2P overlay network based on said peer state information.

15. The non-transitory computer readable storage medium of claim 11, further comprising:

acquiring a network segment identifier for each peer; and
determining in which network segment each peer should belong based on said network segment identifier.

* * * * *